May 28, 1929.   T. M. EYNON   1,714,501
MECHANISM FOR INDICATING TIRE DEFLATION
Original Filed Sept. 16, 1919
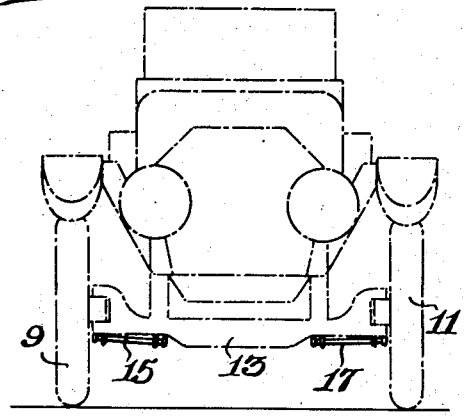
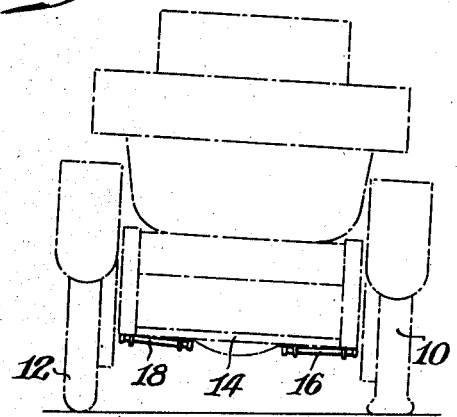
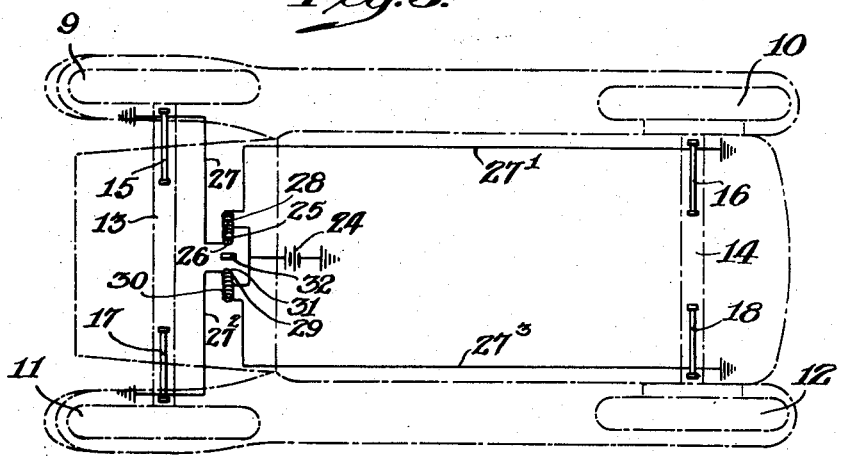
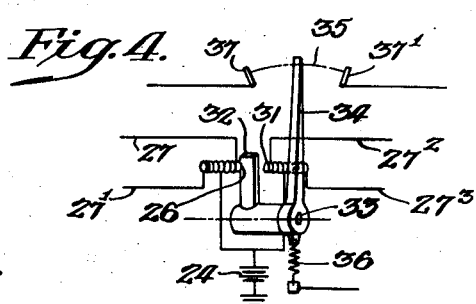
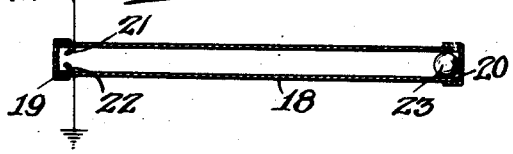
INVENTOR.
Thomas M. Eynon
BY
ATTORNEY.

Patented May 28, 1929.

1,714,501

UNITED STATES PATENT OFFICE.

THOMAS M. EYNON, OF PHILADELPHIA, PENNSYLVANIA, ASSIGNOR TO MARGARET Y. EYNON, OF PHILADELPHIA, PENNSYLVANIA.

MECHANISM FOR INDICATING TIRE DEFLATION.

Original application filed September 16, 1919, Serial No. 324,059, now Patent No. 1,662,381. Divided and this application filed November 24, 1922. Serial No. 602,994.

My invention relates to signal devices and more particularly to devices for automatically signaling tire deflation of running automobiles.

The main purpose of my invention is to provide efficient inexpensive means for promptly and automatically signaling tire deflation in a running automobile to the driver.

A further purpose is to provide along the axle near each wheel a closed tube positioned normally to incline inward but to incline outward if the tire becomes deflated, and a ball piston sluggishly rolling therein normally at the inward end and sluggishly rolling to the outer end with tire deflation, and signal contacts in the outer end thereof adapted to co-operate with the ball piston for signaling when they engage.

A further purpose is to provide means for avoiding signaling from mere temporary lateral inclination of the road by having front and rear signal circuits that oppose and neutralize one another if acting simultaneously.

A further purpose is to provide each side of the car with an electric magnet controlling the signal indicator and wound for equal and opposite energizing if contacts are closed at both front and hind wheels and adapted to throw the indicator of the signal when contacts are closed at either front or hind wheels but not with simultaneous circuit at both.

Further purposes will appear in the specification and claims.

I have preferred to illustrate my invention by but one form thereof, selecting a form which is practical, efficient and inexpensive and which at the same time well illustrates the principles of my invention.

Figure 1 is an outline front elevation of an automobile having my invention applied thereto.

Figure 2 is a similar rear elevation showing the position of the parts with one tire flat.

Figure 3 is a diagrammatic bottom plan view showing the electrical connections.

Figure 4 is a view partly perspective and partly diagrammatic showing the connections to the indicator.

Figure 5 is a longitudinal section of the contact device.

This application is a division of my pending application No. 324,059, filed September 16, 1919, now Patent No. 1,662,381.

Referring to the drawings and describing in illustration and not in limitation:—

Considering Figures 1 to 3, I show the wheels 9, 10, 11, 12, upon the axles 13, 14 and contact tubes 15, 16, 17, 18 supported from the axles and preferably though not necessarily in juxta-position to the wheels.

The contact tubes are closed at the ends at 19 and 20 sealing in the air to provide damping dash-pot action upon the rolling ball 23 which fits the tube fairly closely. An incidental but important advantage from thus sealing the contact tubes is the keeping out of dirt and moisture.

The contact tubes normally slope inward from the wheels but to an extent so slight as to be reversed at any wheel if the tire becomes deflated. Normally the balls remain at the inner ends of the contact tubes, by reason of the normal inner slope, but with deflation at any wheel the ball at that wheel rolls to the outer end of its tube by reason of the reversal of the slope of the tube and engages contacts 21 and 22 thereby completing an electric circuit for operating the signal.

Of the contacts 21 and 22, one is insulated from the tube while the other is conveniently in electric connection with the tube and may in fact be merely the bottom of the tube, a portion of the circuit being through the frame of the car.

The dash-pot action of the air within the tubes prevent the balls from responding spasmodically to jerks and jars of the car and yet in no wise prevents the balls from rolling slowly even on a very slight incline.

The electric circuit is from the frame of the car through a source of current 24 and winding 25 of an electro-magnet 26 to the insulated contact of the tube and if the ball is engaging this contact through the ball to the tube and the frame, or between the source of current and any of the other tubes 16, 17, 18 respectively through electromagnet windings 28, 29, 30.

The windings 25 and 28 respectively of the circuits through the tubes 15 and 16 on one side of the car are both on the same electromagnet 26 and relatively balance and oppose one another so that when both circuits are closed the magnet is inoperative; and in the same way the windings 29 and 30 of the circuits through the tubes 17 and 18 on the other side of the car balance and oppose one another on the electro-magnet 31 so that when both these circuits are closed this magnet is inoperative.

The electro-magnets 26 and 31 are on opposite sides of an armature 32 pivoted upon an axis 33 and controlling a pointer 34. The pointer is held to the middle of the scale 35 by a tension spring 36 which may serve also to pass current from any suitable source through the pointer to contacts 37 or 37′ to ring a bell when the armature is thrown.

In operation, the automobile is driven as usual up and down hill and through temporary stretches of laterally sloping road without the deflation indicator moving. If the tire flattens from a puncture a signal is given at the indicator at once if the car is running on a normal up and down hill road of fairly little lateral slope, and if the car is temporarily on a stretch of road having considerable lateral slope, and the flattening is on the low side the signal is given as soon as the car reaches road of normal lateral slope, and it is given at once if the puncture is on the up hill side of the car.

On the steeper lateral slopes the indicator does not work when a tire is punctured because the balls on the down side of the car close the circuits at both front and rear which at the corresponding electro-magnet balance and neutralize each other; when the car reaches normal road only one circuit opens if there has been a puncture on the down side of the car on the abnormal slope of road, and the balance being thus upset the signal is given. If on the steep lateral slope the puncture is on the up side of the car, the signal is given at once while the car is still on the abnormal slope because the flattening of the tire relieves the abnormality in the slope of the tube at the wheel of the puncture.

I am aware that in view of my invention and disclosure modifications and variations to meet individual whim or particular need will become evident to others skilled in the art, and I claim all such modifications in so far as they fall within the reasonable spirit and scope of my invention.

Having thus described my invention, what I claim as new and desire to secure by Letters Patent is:—

1. The method of indicating a flat tire on a four wheeled vehicle having a signal and gravity actuated devices one each on corresponding ends of each axle, inoperative when the axle is level and operative when the end carrying the device is lowered, which consists in producing a force to cause the operation of the signal when either gravity device is operative alone, said forces being equal, and uniting said forces so as to oppose and neutralize each other when produced simultaneously.

2. The method of indicating flat tire deflation independently of either of the tires at the same side of the car while protecting against indication when that entire side of the car is low which consists in producing a force to cause separate indication of the depression of the two axles and in neutralizing the force effective for indication of depression of one axle by the force effective for indication of the other axle when both are depressed together.

3. The method of indicating flat tire deflation independently of either of the tires at the same side of the car while protecting against indication when that entire side of the car is low which consists in separately actuating the same indicator electromagnetically by reason of depression of either of the axles on that side of the car and in balancing the electromagnetically actuating forces to free the indicator from actuation when both axles are depressed.

4. In a device for signaling tire deflation of a running automobile, an armature, a signal operated thereby, energizing means for the armature operative by an abnormal inclination of the front axle of the automobile, and an equal and opposite other energizing means operative by an abnormal similar inclination of the rear axle.

5. In a device for signaling tire deflation of a running automobile, a signal, gravity operated means for the signal interconnected with the front axle for actuation with depression of this axle, gravity operated means for the signal interconnected with the rear axle for actuation with depression of this axle, and interconnection between the two operating means negativing the operation of one by operation of the other.

6. In a device for signaling tire deflation of a running automobile, an electromagnet having two windings, a signal operated thereby through either winding, the operating effects being opposed, gravity-actuated contact devices closed by depression of the front and rear axles respectively and electric circuits through these contact devices and through the two windings respectively, whereby the energization of either circuit will operate the signal but the energization of the two circuits will be without effect upon the signal.

THOMAS M. EYNON.